United States Patent [19]
Kondo et al.

[11] Patent Number: 5,202,548
[45] Date of Patent: Apr. 13, 1993

[54] RESISTANCE ADJUSTING TYPE HEATER

[75] Inventors: Tomoharu Kondo, Toki; Fumio Abe, Handa, both of Japan

[73] Assignee: NGK Insulators, Ltd., Japan

[21] Appl. No.: 813,606

[22] Filed: Dec. 26, 1991

[30] Foreign Application Priority Data

Jan. 16, 1991 [JP] Japan .................................. 3-015880

[51] Int. Cl.$^5$ .......................... H05B 3/10; F01N 3/10; B01D 53/36
[52] U.S. Cl. .................................... 219/552; 219/205; 392/488; 428/116; 60/300; 422/174; 55/DIG. 30
[58] Field of Search ............... 392/502, 347, 379, 485, 392/486, 488, 490; 219/542, 541, 552, 553; 422/174, 175, 177, 179, 180; 502/527, 439; 60/300; 423/212 C, 239; 428/116

[56] References Cited

U.S. PATENT DOCUMENTS

| | | | |
|---|---|---|---|
| 4,364,760 | 12/1982 | Higuchi et al. | 422/180 |
| 5,063,029 | 11/1991 | Mizuno et al. | 422/175 |
| 5,098,763 | 3/1992 | Horikawa et al. | 428/116 |

FOREIGN PATENT DOCUMENTS

| | | |
|---|---|---|
| 63-67609 | 5/1988 | Japan . |
| 8910471 | 11/1989 | World Int. Prop. O. . |

Primary Examiner—Bruce A. Reynolds
Assistant Examiner—Michael O. Switzer
Attorney, Agent, or Firm—Parkhurst, Wendel & Rossi

[57] ABSTRACT

A resistance adjusting type heater including a honeycomb structure, electrodes provided on the honeycomb structure, and slits as a resistance adjusting device provided between the electrodes, a sealing device for sealing a heat-non-generating portion of the honeycomb structure, wherein a gas is introduced into the passages of the heat-generating portion of the honeycomb structure and is heated. With this heater, the entirety of the exhaust gas introduced into the heater can be heated rapidly thereby ensuring excellent purification efficiency.

7 Claims, 3 Drawing Sheets

RESISTANCE ADJUSTING TYPE HEATER

BACKGROUND OF THE INVENTION AND RELATED ART STATEMENT

The present invention relates to a resistance adjusting type heater which can be suitably used for purification of automobile exhaust gas, for example.

Porous ceramic honeycomb structures are presently used as, a catalyst, or a catalyst carrier, for conversion of nitrogen oxides ($NO_x$), carbon monoxide (CO) and hydrocarbons (HC) present in the exhaust gas emitted from the internal combustion engines of automobiles, etc. Further, metallic honeycomb structures have drawn attention recently.

Meanwhile, with the stricter emission controls gas, it is desired to develop a heater or the like capable of reducing emissions at cold start of an engine is desired.

As a honeycomb structure as mentioned above, there Japanese Utility Model Laid-Open No. 67609/1988 utilizes a honeycomb structure as noted above. In this document, there is disclosed a catalytic converter comprising (a) a ceramic main monolith catalyst and (b) an electrically heatable metal monolith catalyst provided upstream of the ceramic main monolith catalyst (a) in close vicinity thereto. The metal monolith consists of a metal carrier and alumina coated thereon.

In the catalytic converter described in the document, the metal monolith catalyst thereto is a foil type metal honeycomb structure wherein electricity is passed from the inner periphery to the outer periphery for heating the structure. The metal monolith has no resistance adjusting means (that is, only the material, dimension and rib thickness are specified and no resistance control is made). Moreover, the metal monolith catalyst has substantially the same cross-sectional diameter as the main monolith catalyst; Therefore, the metal monolith suffers from insufficient heat-generation.

Hence, the present applicant proposed in U.S. Pat. No. 5,063,029 a heater comprising a honeycomb structure, at least two electrodes for enabling electrical heating of the honeycomb structure, provided on the honeycomb structure, and a resistance adjusting means provided between the electrodes. This heater is capable of controlling its heat-generating property and is useful for reducing automobile emissions at cold start.

However, when slits such as shown in FIG. 1 are used as resistance adjusting means in the above-described heater, the honeycomb structure 10 has a heat-non-generating portion 12 at the outer periphery 11. Consequently, exhaust which gas passes through portion 12 is not sufficiently or efficiently purified.

SUMMARY OF THE INVENTION

The present invention provides a resistance adjusting type heater which has eliminated the above problems of the prior devices.

According to the present invention, there is provided a resistance adjusting type heater comprising;

a honeycomb structure having a large number of passages, at least two electrodes provided on the honeycomb structure to enable electrical heating on thereof, resistance adjusting means provided between the electrodes, and sealing means for sealing a heat-non-generating portion of the honeycomb structure, wherein a gas is introduced into the passages of the heat-generating portion of the honeycomb structure and is heated.

In the resistance adjusting type heater of the present invention, it is preferable that the outer periphery of the honeycomb structure is covered with a band by insulating material, such that the heat-non-generating portion of the honeycomb structure is sealed by the band.

DETAILED DESCRIPTION OF PREFERRED EMBODIMENTS

In the honeycomb heater of the present invention, the heat-non-generating portion is sealed and a gas is introduced into only into the heat-generating portion, whereby the all of the exhaust gas introduced is heated rapidly thereby ensuring excellent purification efficiency.

The method for sealing the heat-non-generating portion of the resistance adjusting type heater of the present invention is described.

Figure 1:
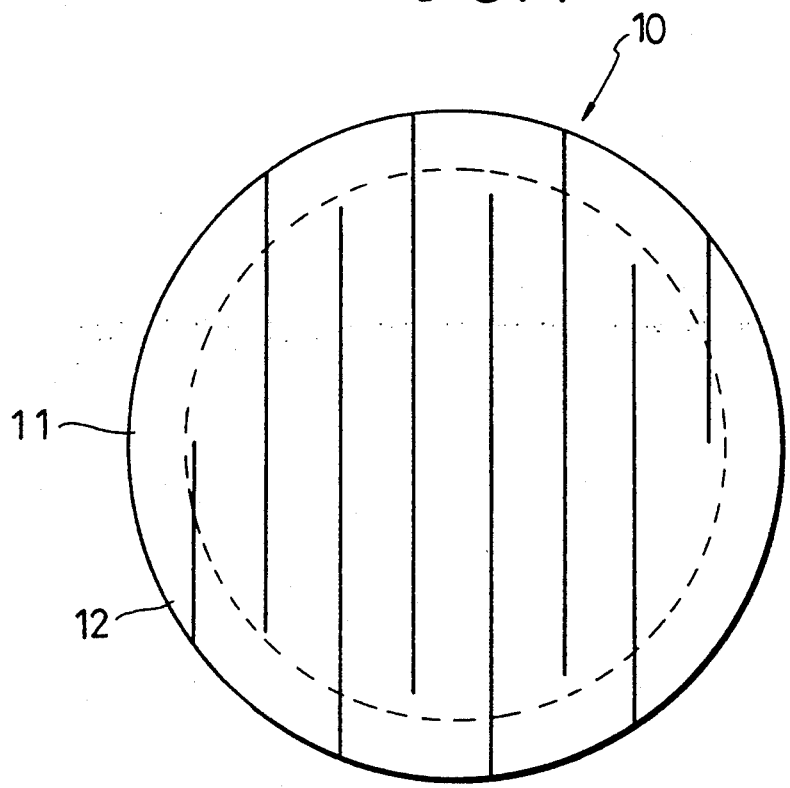
FIG. 1 is a schematic plane view showing an example of the honeycomb structure.
Figure 2:
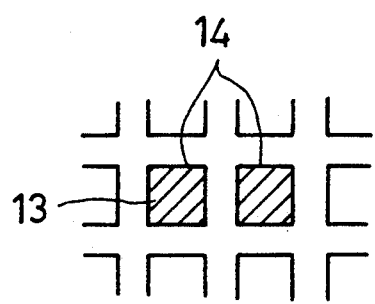
FIG. 2 is a view showing a case where the passages of the heat-non-generating portion of the honeycomb structure are filled with an adhesive.

(1) As shown in FIG. 2, the passages 13 of the heat-non-generating portion 12 are filled with a ceramic-based adhesive 14 or the like.

Figure 3:
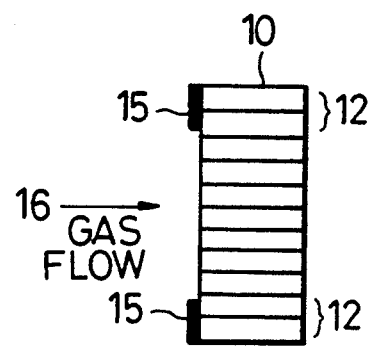
FIG. 3 is a view showing a case wherein the heat-non-generating portion of the honeycomb structure is covered with an inorganic material.

(2) As shown in FIG. 3, the gas-incoming side (upstream side) 16 of the heat-non-generating portion 12 of the honeycomb structure 10 is covered with a heat-resistant inorganic material 15 such as tape, mat, cloth, band or the like made of ceramic fiber.

(3) A combination of the methods (1) and (2).

Any of the above methods (1), (2) and (3) for sealing the heat-non-generating portion can be easily used and is preferable for use in, for example, hot air heaters for domestic use.

Under severe vibrations at high temperatures, however, the ceramic-based adhesive may be detached or the inorganic material covering the gas-incoming side of the heat-non-generating portion may be broken and detached in small pieces, in some cases.

Figure 4:
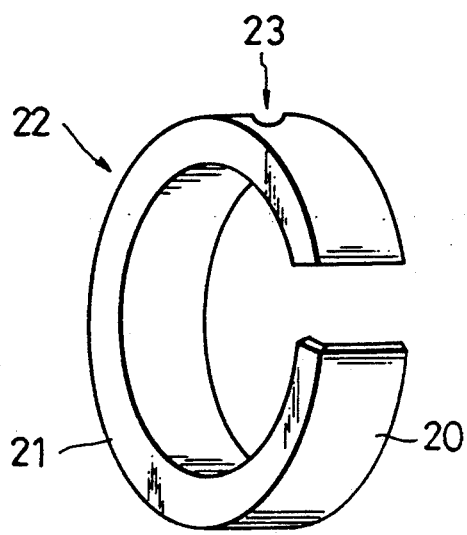
FIG. 4 is a perspective view showing an example of the band with a ring.

In such cases, it is preferable to use, as shown in FIG. 4, a band 22 for sealing the heat-non-generating portion, consisting of (a) a metallic band member 20 of about 0.2-2.0 mm in thickness, made of, for example, stainless steel and (b) a ring 21 attached to the band member 20 so as to cover the heat-non-generating portion 12. When band 22 for sealing the heat-non-generating portion is used, the honeycomb heater is set inside the band 22, whereby the blowing-through of exhaust gas is prevented. In FIG. 4, hole 23 is shown for lead wire connection to the electrode(s).

In setting the honeycomb heater inside the band 22, an insulating material such as ceramic mat, cloth or the like is used between the honeycomb heater and the band member 20 for insulation of the two. Further, a similar insulating material is used between the ring 21 and the honeycomb heater. It is possible that the band member 20 and the ring 21 be subjected to ceramic coating, for example, thermal spraying of $Al_2O_3$ or $ZrO_2$ to form an insulating protective film on the respective surfaces of the band member 20 and the ring 21.

The honeycomb heater is set inside the band 22, and the band 22 is welded and mechanically fixed to the honeycomb heater. This can prevent the deformation, etc. of the honeycomb heater.

The band 22 in which the honeycomb heater has been set, is welded to a casing (an outer frame), whereby the honeycomb heater can be fixed strongly to the casing.

Figure 5:
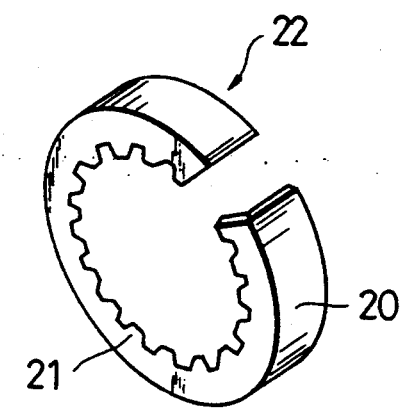
FIG. 5 is a perspective view showing other example of the band with a ring.

The ring 21 may have unevennesses 24 on the inner surface for the processing reason, as shown in FIG. 5. The band 22 for sealing the heat-non-generating portion may be produced in one piece wherein the band member 20 and the ring 21 have been integrated, or by setting the honeycomb heater inside the band member 20 and then fixing the ring 21 by welding or the like.

The material for the band 22 is preferably stainless steel in view of its corrosion resistance and particularly preferably austenitic stainless steel in view of its conformity to the thermal expansion of the honeycomb heater.

Figure 6:
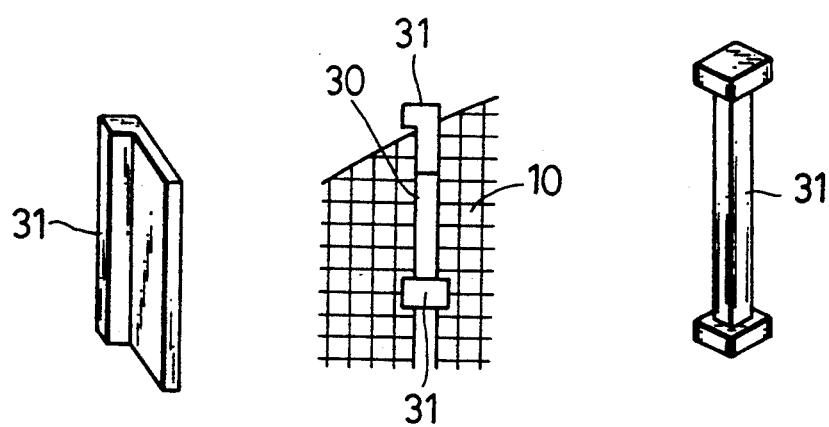
FIG. 6 is a view showing a case wherein an insulating material is inserted into the slits of the resistance adjusting type heater of the present invention.

In the present invention, a resistance adjusting means is provided between the electrodes of the honeycomb structure. When the resistance adjusting means is slits, an insulating member (spacer) 31 made of alumina or other ceramic may be inserted into the slits 30 of the honeycomb heater, as shown in FIG. 6. Preferably, further an inorganic adhesive is filled in slits 30 whereby the overall structure of the honeycomb heater is strengthened. The insulating member (spacer) 31 can be inserted at a suitable position in the slits 30, for example, at outer periphery of the honeycomb heater.

Whereas any material, ceramic or metal, capable of generating heat when energized, can be used as the material of the honeycomb structure which is a basic body of the present invention, metal enhances the mechanical strength and is thus preferred. Examples of such metals include stainless steel materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can closely adhere to the honeycomb structure, and hardly peels therefrom even when a difference in the thermal expansion between the honeycomb structure and the catalyst exists.

The metal honeycomb structure will be prepared in the manner described below.

First, Fe powder, Al powder and Cr powder, or alternatively, powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 1450° C. During sintering in the non-oxidizing atmosphere containing hydrogen, the organic binder is decomposed and thereby removed with the aid of Fe or the like, which acts as a catalyst. A good sintered body of a honeycomb structure can therefore be obtained.

Sintering at a temperature lower than 1000° C. achieves no sintering. Sintering conducted at a temperature higher than 1450° C. causes deformation of the resulting sintered body and is thus undesirable.

Preferably, a heat-resistant metal oxide is then coated on the surface of the cell walls and the surface of the pores of the obtained honeycomb structure.

Next, a resistance adjusting mechanism of a desired form is preferably provided on the obtained honeycomb structure between the electrodes thereof, which will be described later.

The resistance adjusting mechanism provided on the honeycomb structure may take on any of the following forms:

(1) a slit or slits of any length, formed in any direction at any position;

(2) variations in the length of the cell walls in the axial direction of the passages;

(3) variations in the thickness (wall thickness) of the cell walls of the honeycomb structure or variations in the cell density of the honeycomb structure; or (4) a slit or slits formed in the cell wall (rib) of the honeycomb structure.

Among the above-mentioned forms, formation of a slit or slits according to No. (1) is preferable because it can easily control a heated portion.

Electrodes are provided generally on the outer peripheral portion of or inside of the thus-obtained metal honeycomb structure by welding or brazing to manufacture a honeycomb heater.

The term, "electrodes" is used in this application to refer to any terminal through which a voltage is applied to the heater. The electrodes include the direct bonding of the outer peripheral portion of the heater to a can body and terminals for grounding.

In the case of the metal honeycomb structure which is used as a heater, the resistance thereof will be preferably held between $0.001\Omega$ and $0.5\Omega$.

Preferably, a catalyst is placed on the surface of the thus-obtained metal honeycomb structure so as to allow heat to be generated due to reaction (oxidation) of the exhaust gas.

The catalyst supported on the surface of the metal honeycomb structure is made of a carrier having a high surface area and a catalyst activating material supported on the carrier. Typical examples of the carriers having a high surface area included $\gamma$-$Al_2O_3$, $TiO_2$, $SiO_2$-$Al_2O_3$ and perovskite. Examples of the catalytic activating material include noble metals, such as Pt, Pd and Rh, and base metals, such as Cu, Ni, Cr and Co. The preferred catalyst comprises one in which from 10 to 100 $g/ft^3$ Pt or Pd is loaded on the carrier made of $\gamma$-$Al_2O_3$.

Whereas the honeycomb structure employed in the present invention may have any honeycomb configuration, it is desirable that the cell density ranges from 6 to 1500cells/$in^2$ (0.9 to 233 cells/$cm^2$) with a wall thickness ranging from 50 to 2000 $\mu$m.

As stated above, the honeycomb structure employed in the present invention may be porous or non-porous.

To achieve sufficient mechanical strength and resistance to oxidation and corrosion, however, the porosity of the metal honeycomb structure will preferably be held between 0 and 50 by volume, most preferably being less than 25% by volume. In a metal honeycomb structure designed for use as a substrate for catalyst, the porosity will be held 5% or above to ensure strong adhesion between the honeycomb structure and a catalyst layer.

The term, "honeycomb structure" is employed in this application to refer to an integral body having a large number of passages partitioned by walls. The passages may have any cross-sectional form (cell shape), e.g., a circular, polygonal or corrugated form.

The present invention is hereinafter described in more detail by way of Examples. However, the present invention is by no means restricted to these Examples.

EXAMPLE 1

Fe powder, Fe-Al powder (Al: 50 wt. %) Fe-Cr powder (Cr: 50 wt. %) having average particle diameters of 10 μm, 20 μm and 22 μm, respectively, were compounded so as to give a composition of Fe-22Cr-5Al (% by weight). Thereto were added an organic binder (methyl cellulose), an antioxidant (oleic acid) and water to prepare a body. The body was extruded to obtain a honeycomb structure consisting of square cells having a rib thickness of 4 mil and passages of 400 cells/in$^2$ (cpi$^2$). The honeycomb structure was dried and then fired in a H$_2$ atmosphere at 1,300° C. Thereafter, the honeycomb structure was subjected to a heat treatment in air at 1000° C. The resulting honeycomb structure had a porosity of 22% by volume and an average pore diameter of 5 μm.

Figure 7:
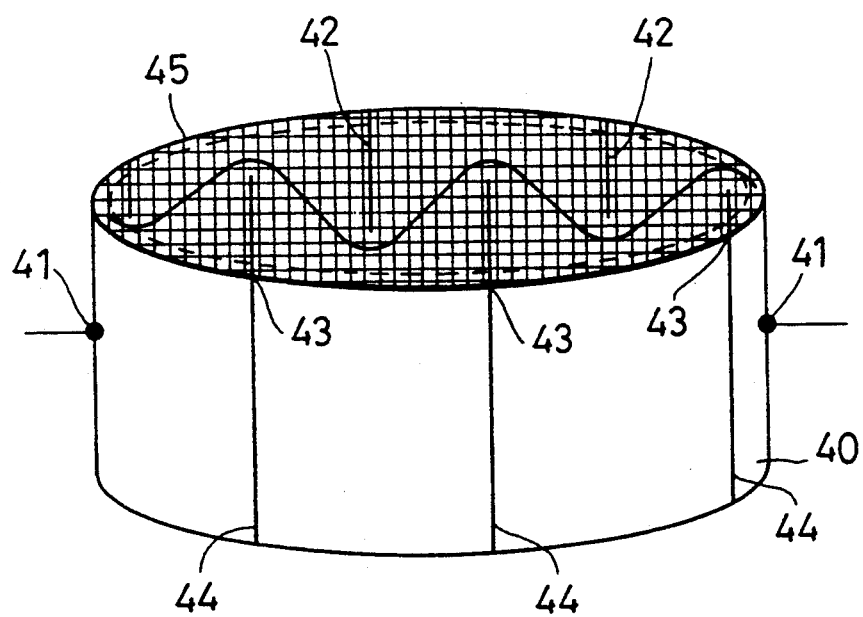
FIG. 7 is a perspective view showing an embodiment of a resistance adjusting type heater according to the present invention.

On the outer wall 40 of the thus obtained honeycomb structure having an outside diameter of 90 mm and a length of 15 mm were provided two electrodes 41, as shown in FIG. 7. Also shown in FIG. 7, six slits 42 each of 70 mm in length were provided in the honeycomb structure in the axial direction of the passages (the slits provided at the two ends had a length of 50 mm) so that the number of cells between the adjacent two slits became 7 (about 10 cm). Into each slit 42 were filled an alumina plate 43 and a silica-alumina inorganic adhesive 44.

The resulting honeycomb structure was coated with γ-Al$_2$O$_3$. On the coated γ-Al$_2$O$_3$ was loaded noble metals Pt and Pd each in an amount of 20 g/ft$^3$. The resulting structure was fired at 600° C. to obtain a catalyst-supported honeycomb heater.

Then, the inside of each passage of the heat-non-generating portion 45 (having a width of about 15-20 mm from the outer periphery) of the catalyst-supported honeycomb heater was filled with a silica-alumina inorganic adhesive to seal the heat-non-generating portion 45 to obtain a resistance adjusting type heater.

EXAMPLE 2

A catalyst-supporting honeycomb heater was prepared in the same manner as in Example 1.

Separately, a band with a ring (a band for sealing the heat-non-generating portion) was prepared from SUS 310S of 1.0 mm in thickness so that it could cover the heat-non-generating portion (i.e. the portion 15 mm wide from the outer periphery) of the above-prepared catalyst-supported honeycomb heater.

Next, the outer periphery and gas-incoming side of the catalyst-supported honeycomb heater were covered with SiO$_2$-Al$_2$O$_3$ ceramic mat and then with the above-prepared band with a ring, after which the band and the heater were welded to obtain a resistance adjusting type heater.

COMPARATIVE EXAMPLE 1

Comparative Example 1 was the same honeycomb heater as in Example 1 except that the heat-non-generating portion 53 was not sealed. Evaluation of performance as preheater for automobile exhaust gas In order to examine the performances during an engine starting period, the resistance adjusting type heaters obtained in Examples 1 and 2 and Comparative Example 1 were installed each as preheater's, before a commercially available three-way catalyst. Then, each preheater was electrified and an exhaust gas was introduced from an engine so that the temperature at the catalyst inlet was increased from 100° C. to 420° C. in 2 minutes (temperature increase at a constant rate) and then kept at 420° C. for 1 minute, and the conversion of each exhaust gas component was measured.

Each preheater was electrified for 1 minute by a 12-V battery. The average conversion of each exhaust gas component for 0 to 3 minutes is shown in Table 1.

TABLE 1

| Preheater | Average conversion (%) | | |
|---|---|---|---|
| | Gas component | | |
| | CO | HC | NO$_x$ |
| Example 1 | 75 | 61 | 78 |
| Example 2 | 76 | 62 | 77 |
| Comparative Example 1 | 70 | 55 | 68 |

As described above, in the resistance adjusting type heater of the present invention, the heat-non-generating portion of the honeycomb structure is sealed and a gas is introduced only into the heat-generating portion. Consequently, all of the exhaust gas introduced can be heated rapidly thereby ensuring an excellent purification efficiency.

What is claimed is:

1. A heater for heating fluid flowing therethrough, comprising:
    an electrically conductive integral honeycomb structure having a radial periphery and two ends, including a plurality of passages which are defined by partition walls and extend in an axial direction between the ends;
    at least one slit formed though said partition walls of said honeycomb structure;
    at least two electrodes in electrical contact with said honeycomb structure wherein said at least one slit is disposed between said electrodes to adjust the resistance of the honeycomb structure; and
    sealing means for sealing a heat non-generating portion of the honeycomb structure whereby gas flow is restricted from the passages of the heat non-generating portion.

2. The heater of claim 1, wherein said sealing means comprises a band fitted along an outer periphery of the honeycomb structure, wherein insulating material is interposed between the band and the honeycomb structure.

3. The heater of claim 2, wherein said band comprises a metallic band member and a ring fixed to said metallic band member, whereby said ring covers said heat non-generating portion.

4. The heater of claim 1, wherein said sealing means comprises a ceramic adhesive filling the passages of the heat non-generating portion.

5. The heater of claim 1, where said sealing means comprises an inorganic material sealing said heat non-generating portion along a gas incoming side of said honeycomb structure.

6. The heater of claim 1, further comprising a spacer made of insulating material fitted into said at least one slit, and inorganic material filled into said at least one slit.

7. The heater of claim 1, wherein the heat non-generating portion comprises portions of partition walls which define passages adjacent to the radial periphery of the honeycomb structure.

* * * * *